(12) United States Patent
Lu et al.

(10) Patent No.: US 11,781,905 B2
(45) Date of Patent: Oct. 10, 2023

(54) OPTICAL SENSING DEVICE AND ELECTRONIC APPARATUS HAVING THE SAME

(71) Applicant: Au Optronics Corporation, Hsinchu (TW)

(72) Inventors: Shih-Hua Lu, Hsinchu (TW);
Shang-Wei Hsieh, Hsinchu (TW);
Chao-Chien Chiu, Hsinchu (TW)

(73) Assignee: Au Optronics Corporation, Hsinchu (TW)

( * ) Notice: Subject to any disclaimer, the term of this patent is extended or adjusted under 35 U.S.C. 154(b) by 0 days.

(21) Appl. No.: 17/711,070

(22) Filed: Apr. 1, 2022

(65) Prior Publication Data
US 2022/0373387 A1     Nov. 24, 2022

Related U.S. Application Data

(60) Provisional application No. 63/189,960, filed on May 18, 2021.

(30) Foreign Application Priority Data

Nov. 30, 2021    (TW) .................................. 110144599

(51) Int. Cl.
*G01J 1/04*      (2006.01)
*G02B 1/115*     (2015.01)
*G02B 5/00*      (2006.01)
*G06V 40/13*     (2022.01)

(52) U.S. Cl.
CPC ............ *G01J 1/0418* (2013.01); *G02B 1/115* (2013.01); *G02B 5/005* (2013.01); *G06V 40/1318* (2022.01)

(58) Field of Classification Search
CPC ............ H01L 27/1462; H01L 27/14623; G01J 1/0418; G02B 1/115; G02B 5/005; G06V 40/1318
See application file for complete search history.

(56) References Cited

U.S. PATENT DOCUMENTS

| | | | |
|---|---|---|---|
| 9,666,620 B2 | 5/2017 | Wang | |
| 9,881,959 B2 | 1/2018 | Lin et al. | |
| 11,194,988 B2 | 12/2021 | Xu et al. | |
| 2016/0049436 A1 | 2/2016 | Lin et al. | |

(Continued)

FOREIGN PATENT DOCUMENTS

| | | |
|---|---|---|
| CN | 105990378 | 10/2016 |
| CN | 109299631 | 2/2019 |

(Continued)

*Primary Examiner* — Kevin K Pyo
(74) *Attorney, Agent, or Firm* — JCIPRNET (57) ABSTRACT

An optical sensing device includes a substrate, a sensing element layer, a light-shielding layer, and a light absorbing layer. The substrate has a first surface and a second surface opposite to each other. The sensing element layer is disposed on the first surface and includes multiple sensing elements. The light-shielding layer is disposed on the sensing element layer and has multiple openings. An orthogonal projection of the opening on the substrate overlaps an orthogonal projection of the sensing element on the substrate. The light absorbing layer is disposed on the second surface. An electronic apparatus including the optical sensing device is also provided.

14 Claims, 7 Drawing Sheets

(56) References Cited

U.S. PATENT DOCUMENTS

| | | | |
|---|---|---|---|
| 2016/0099272 A1 | 4/2016 | Wang | |
| 2018/0069048 A1* | 3/2018 | Wu | ........................ H10K 59/65 |
| 2021/0133420 A1 | 5/2021 | Xu et al. | |
| 2021/0159358 A1 | 5/2021 | Shimohara | |

FOREIGN PATENT DOCUMENTS

| | | | |
|---|---|---|---|
| CN | 110741384 | 1/2020 | |
| CN | 111967402 | 11/2020 | |
| CN | 112861761 | 5/2021 | |
| JP | 2007305675 A * | 11/2007 | ......... H01L 27/1462 |
| TW | 200950046 | 12/2009 | |
| TW | 201607009 | 2/2016 | |
| TW | M596977 | 6/2020 | |
| TW | 202114187 | 4/2021 | |

* cited by examiner

OPTICAL SENSING DEVICE AND ELECTRONIC APPARATUS HAVING THE SAME

CROSS-REFERENCE TO RELATED APPLICATION

This application claims the priority benefits of U.S. provisional application Ser. No. 63/189,960, filed on May 18, 2021, and Taiwanese application serial no. 110144599, filed on Nov. 30, 2021, The entirety of each of the above-mentioned patent applications is hereby incorporated by reference herein and made a part of this specification.

BACKGROUND

Technical Field

The disclosure relates to a sensing device and an electronic apparatus having the same, and in particular to an optical sensing device and an electronic apparatus having the same.

Description of Related Art

In order to provide the information needed to build a smart living environment, various sensors have been widely used in daily life, for example, various optical sensors used to detect biometric features such as fingerprints and venous images. However, test results show that when the sensor is pressed with a finger under strong light (e.g., about 100K lux of sunlight), there are often black shadows or blurred images. One of the possible reasons for this is the increase in sensing noise caused by light passing through the sensor and being reflected by the components below (e.g., elements with reflective surfaces). In addition, one of the possible reasons is that the optical sensor needs to be equipped with light collimation structure to improve the sensing resolution, and the stray light caused by the reflection of the irradiated light entering the sensor through the light collimation structure will also cause the sensor to increase the sensing noise, resulting in a lower sensing resolution of the sensor.

SUMMARY

The disclosure provides an optical sensing device with improved sensing resolution.

An embodiment of the disclosure proposes an optical sensing device including: a substrate having a first surface and a second surface opposite to each other; a sensing element layer disposed on the first surface, and including multiple sensing elements; a first light-shielding layer disposed on the sensing element layer, and having multiple first openings, in which orthogonal projections of the first openings on the substrate overlaps orthogonal projections of the sensing elements on the substrate; a first light absorbing layer disposed on the second surface.

In one embodiment of the disclosure, the optical sensing device has a sensing area and a non-sensing area. The non-sensing area surrounds the sensing area, and the sensing elements are disposed in the sensing area.

In one embodiment of the disclosure, an orthogonal projection of the first light absorbing layer on the substrate overlaps an orthogonal projection of the sensing area on the substrate.

In one embodiment of the disclosure, an orthogonal projection of the first light absorbing layer on the substrate overlaps an orthogonal projection of the non-sensing area on the substrate.

In one embodiment of the disclosure, an orthogonal projection of the first light absorbing layer on the substrate overlaps orthogonal projections of the sensing area and the non-sensing area on the substrate.

In one embodiment of the disclosure, the optical sensing device further includes a cover plate opposite to the substrate, and the sensing element layer and the first light-shielding; layer are disposed between the cover plate and the substrate.

In one embodiment of the disclosure, the optical sensing device further includes a second light absorbing layer disposed on a side of the cover plate opposite to the first light-shielding layer, and an orthogonal projection of the second light absorbing layer on the cover plate overlaps an orthogonal projection of the non-sensing area on the cover plate.

In one embodiment of the disclosure, the optical sensing device further includes a filter layer disposed on a side of the cover plate opposite to the first light-shielding layer, and an orthogonal projection of the filter layer on the cover plate overlaps an orthogonal projection of the sensing area on the cover plate.

In one embodiment of the disclosure, the first light-shielding layer includes a first metal layer and a first metal oxide layer, the first metal layer is disposed between the first metal oxide layer and the sensing element layer, and a thickness of the first metal oxide layer is between 450 Å and 850 Å.

In one embodiment of the disclosure, the optical sensing device further includes an anti-reflection layer disposed between the first light-shielding layer and the sensing element layer.

In one embodiment of the disclosure, the anti-reflection layer has multiple second openings, and orthogonal projections of the second openings on the substrate overlaps the orthogonal projections of the sensing elements on the substrate.

In one embodiment of the disclosure, the optical sensing device further includes an anti-reflection layer disposed between the sensing element layer and the substrate.

In one embodiment of the disclosure, the anti-reflection layer includes a second metal layer and a second metal oxide layer, and the second metal oxide layer is disposed between the sensing element layer and the second metal layer.

Another embodiment of the disclosure proposes an electronic apparatus including: the optical sensing device as described above; a display panel disposed on a first side of the optical sensing device; an element having a reflective surface, disposed on a second side of the optical sensing device, and the second side opposite to the first side.

In one embodiment of the disclosure, the element having the reflective surface is a conductive element, a heat dissipation element, a shielding element, or a battery.

In one embodiment of the disclosure, the optical sensing device further includes a second light absorbing layer disposed between the display panel and a non-sensing area of the optical sensing device.

In one embodiment of the disclosure, the optical sensing device further includes a filter layer disposed between the display panel and a sensing area of the optical sensing device.

To make the aforementioned more comprehensible, several accompanied with drawings are described in detail as follows.

BRIEF DESCRIPTION OF THE DRAWING

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENT

In the drawings, the thickness of layers, films, panels, areas, etc., are enlarged for clarity. The same reference numerals refer to the same elements throughout the specification. It should be understood that when an element such as a layer, film, area, or substrate is referred to as being "on" or "connected to" another element, it can be directly on or connected to the other element, or an intermediate element may also be present. In contrast, when an element is referred to as being "directly on" or "directly connected to" another element, there are no intermediate elements present. As used herein, "connected" may refer to a physical and/or electrical connection. Furthermore, "electrically connected" or "coupled" may refer to the existence of other elements between the two elements.

It should be understood that, although the terms "first". "second", "third", etc. may be used herein to describe various elements, components, areas, layers and/or sections, these elements, components, areas, layers and/or sections shall not be limited by these terms. These terms are only used to distinguish one element, component, area, layer or section from another element, component, area, layer, or section. Thus, a first "element," "component," "area," "layer" or "section" discussed below could be termed a second element, component, area, layer, or section without departing from the teachings herein.

The terminology used herein is for the purpose of describing particular embodiments only and is not limiting. As used herein, the singular forms "a," "an," and "the" are intended to include the plural forms including "at least one" or mean "and/or" unless the content clearly dictates otherwise. As used herein, the term "and/or" includes any and all combinations of one or more of the associated listed items. It should also be understood that when used in this specification, the terms "include" and/or "comprise" designate the presence of stated features, areas, wholes, steps, operations, elements and/or components, but do not exclude the presence or addition of one or more other features, areas, wholes, steps, operations, elements, components and/or combinations thereof.

Furthermore, relative terms such as "lower" or "bottom" and "upper" or "top" may be used herein to describe one element's relationship to another element, as shown in the figures. It should be understood that relative terms are intended to encompass different orientations of the device in addition to the orientation shown in the figures. For example, if the device in one of the figures is turned over, elements described as being on the "lower" side of other elements would then be oriented on "upper" sides of the other elements. Thus, the exemplary term "lower" may include an orientation of "lower" and "upper", depending on the particular orientation of the figures. Similarly, if the device in one of the figures is turned over, elements described as "below" or "beneath" other elements would then be oriented "above" the other elements. Thus, the exemplary terms "below" or "beneath" can encompass an orientation of above and below.

Considering the particular amount of measurement and measurement-related error discussed (i.e., the limitations of the measurement system), "about," "approximately," or "substantially" as used herein includes the average of the stated value and an acceptable range of deviations from the particular value as determined by those skilled in the art. For example, "about" can mean within one or more standard deviations of the stated value, or within ±30%, ±20%, ±10%, ±5%. Furthermore, the s "about", "approximately", or "substantially" as used herein can be chosen from a range of acceptable deviations or standard deviations depending on the optical properties, etching properties, or other properties, rather than one standard deviation for all properties.

Figure 1A:
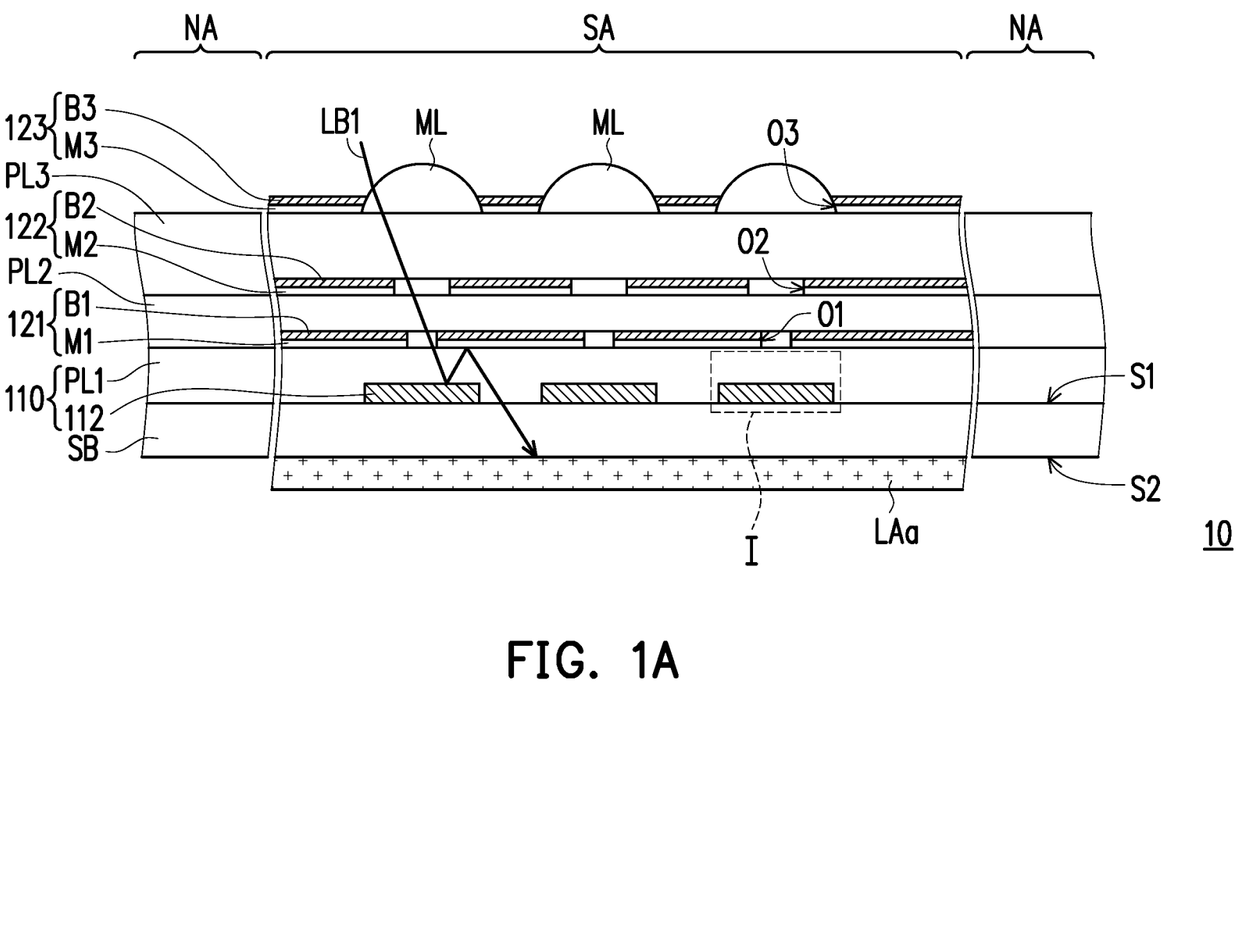
FIG. 1A is a schematic cross-sectional view of an optical sensing device 10 according to an embodiment of the disclosure.
Figure 1B:
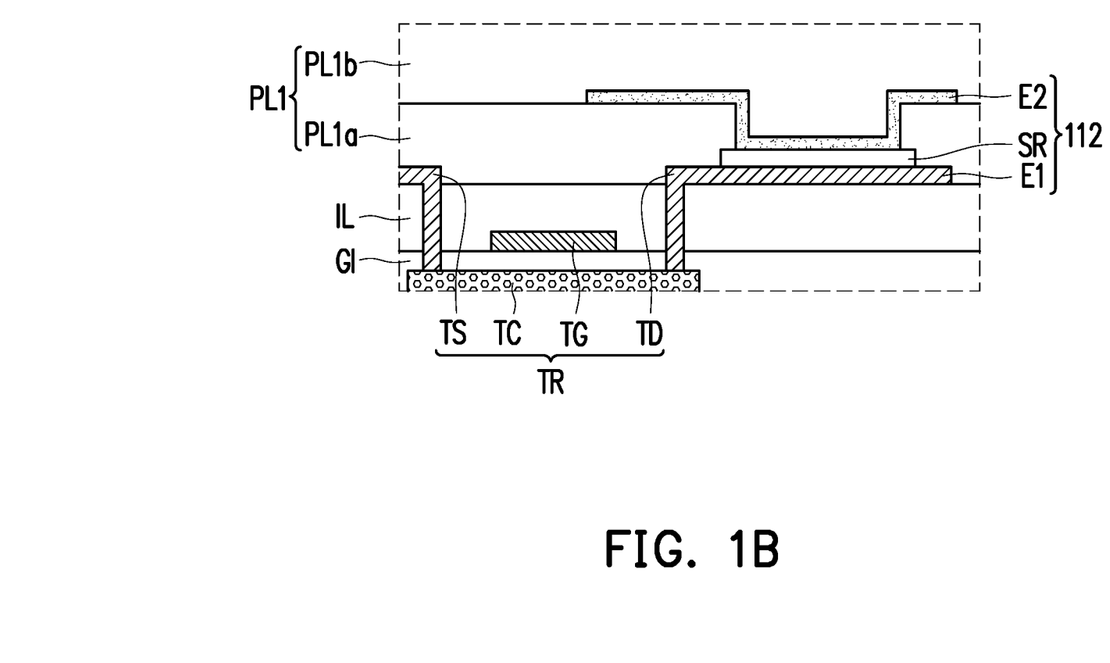
FIG. 1B is an enlarged schematic view of an area I of the optical sensing device 10 of FIG. 1A.

FIG. 1A is a schematic cross-sectional view of an optical sensing device 10 according to an embodiment of the disclosure. FIG. 1B is an enlarged schematic view of an area. I of the optical sensing device 10 of FIG. 1A, Referring to FIG. 1A first, the optical sensing device 10 includes: a substrate SB having a first surface S1 and a second surface S2 opposite to each other; a sensing element layer 110 disposed on the first surface S1 and including multiple sensing elements 112; a first light-shielding layer 121 disposed on the sensing element layer 110 and having multiple openings O1, in which orthogonal projections of the openings O1 on the substrate SB overlapping orthogonal projections of the sensing elements 112 on the substrate; and a light absorbing layer LAa disposed on the second surface S2.

In the optical sensing device 10 according to an embodiment of the disclosure, by disposing the light absorbing layer LAa on the second surface S2 of the substrate SB, the reflected light from a beam LB1 passing through the optical sensing device 10 may be absorbed to reduce the sensing noise of the sensing elements 112, thereby improving the sensing resolution of the optical sensing device 10.

Hereinafter, with FIG. 1A to FIG. 1B, the implementation of each element of the optical sensing device 10 is further described, but the disclosure is not limited thereto.

In this embodiment, the substrate SB of the optical sensing device 10 may be a transparent substrate or an opaque substrate, and its material may be a ceramic substrate, a quartz substrate, a glass substrate, a polymer substrate, or other suitable materials, but not limited thereto.

In this embodiment, the sensing element layer 110 may include multiple sensing elements 112 and a planar layer PL1. For example, referring to FIG. 1B, the planar layer PL1 of the sensing element layer 110 may include a planar layer PL1a and a planar layer PL1b. The sensing element 112 may be a visible light fingerprint sensing element or an invisible light fingerprint sensing element such as an infrared fingerprint sensing element. For example, the sensing element 112 may include an electrode E1, a sensing layer SR, and an electrode E2. The sensing layer SR may be disposed between the electrode E1 and the electrode E2, and the electrode E2 may be disposed between the planar layer PL1a and the planar layer PL1b.

Specifically, a material of the electrode E1 may be molybdenum, aluminum, titanium, copper, gold, silver, or other conductive materials, or an alloy combination or stack of two or more of the above materials, A material of the sensing layer SR may be silicon-rich oxide (SRO), silicon-rich oxide doped with germanium, or other suitable materials. A material of the electrode E2 is preferably a transparent conductive material, such as indium tin oxide, indium zinc oxide, aluminum tin oxide, aluminum zinc oxide, indium gallium zinc oxide, or a stack of at least two of the above. Materials of the planar layers PL1a, and the PL1b may include organic materials, such as acrylic materials, siloxane materials, polyimide materials, epoxy materials, or a stack of the above materials, but not limited thereto.

Referring to FIG. 1B, in some embodiments, the sensing element layer 110 may further include multiple switch elements TR, a gate insulating layer GI, and an interlayer insulating layer IL. The multiple switch elements TR may be electrically connected to multiple sensing elements 112 respectively to individually control the operation of the sensing elements 112. For example, the switch element TR may be composed of a semiconductor layer TC, a gate TG, a source TS, and a drain TD. An area where the semiconductor layer TC overlaps the gate TG can be considered as a channel area of the switch element TR. The gate insulating layer GI is disposed between the gate TG and the semiconductor layer TC, and the interlayer insulating layer IL is disposed between the source TS and the gate TG and between the drain TD and the gate TG. The gate TG and the source TS may respectively receive signals from, for example, driving elements, and the electrode E1 of the sensing element 112 may be physically or electrically connected to the drain TD. When the gate TG receives the signal and turns on the switch element TR, the signal received by the source TS may be transmitted to the electrode E1 of the sensing element 112 through the drain TD.

For example, a material of the semiconductor layer TC may include silicon semiconductor material (e.g., polysilicon, amorphous silicon, etc.), oxide semiconductor material, or organic semiconductor material. Materials of the gate TG, the source TS, and the drain TD may include metals with good electrical conductivity (e.g., aluminum, molybdenum, titanium, copper), alloys, or a stack of the metals and/or alloy, but not limited thereto. Materials of the gate insulating layer GI and the interlayer insulating layer IL may include transparent insulating materials, such as silicon oxide, silicon nitride, silicon oxynitride, a stack of the materials or other suitable materials.

In this embodiment, the opening O1 of the first light-shielding layer 121 allows light to enter the sensing layer SR of the sensing element 112, so as to regulate the light-receiving range of the sensing layer SR. In some embodiments, the first light-shielding layer 121 may include a metal layer M1 and a metal oxide layer B1. The metal layer M1 may be disposed between the metal oxide layer B1 and the sensing element layer 110, and the metal oxide layer B1 may be formed by oxidizing and blackening the metal layer M1. For example, the metal layer M1 may include molybdenum (Mo), and the metal oxide layer B1 may include molybdenum tantalum oxide (MoTaOx) formed by oxidation and blackening of molybdenum. In some embodiments, the metal layer M1 may include titanium (Ti), and the metal oxide layer B1 may include titanium oxide (TiOx). In some embodiments, the metal layer M1 may include niobium (Nb), and the metal oxide layer B1 may include niobium oxide (NbOx). In some embodiments, the metal layer M1 may include tungsten (W), and the metal oxide layer B1 may include tungsten oxide (WOx).

In some embodiments, the metal oxide layer B1 may exhibit relatively low reflectivity and generates relatively less reflected stray light at thicknesses between approximately 450 Å and 850 Å, thus reducing the noise ratio entering the sensing layer SR and improving the sensing resolution of the sensing element 112.

In some embodiments, the optical sensing device 10 may further include multiple microlens structures ML. The microlens structure ML is disposed on the first light-shielding layer 121, and orthogonal projections of the microlens structure ML on the substrate SB respectively overlap orthogonal projections of the sensing elements 112 on the substrate SB. Preferably, a central axis of the microlens structure ML may pass through the opening O1 and the sensing layer SR. More preferably, the central axis of the microlens structure ML may overlap a central axis of the opening O1. The microlens structure ML may be a lens structure with a greater central thickness than an edge thickness, such as a symmetrical biconvex lens, asymmetrical biconvex lens, planoconvex lens, or concave-convex lens. The microlens structure ML may improve light collimation, avoid light leakage, or light mixing caused by scattered or refracted light, and further reduce light loss.

In some embodiments, the optical sensing device 10 may further include a second light shielding layer 122. The second light-shielding layer 122 is disposed on the first light-shielding layer 121, and a planar layer PL2 may be disposed between the second light-shielding layer 122 and the first light-shielding layer 121. The second light-shielding layer 122 may have multiple openings O2, and orthogonal projections of the openings O2 on substrate SB overlap the orthogonal projections of the openings O1 on substrate SB. Preferably, the central axis of opening O2 may overlap the central axis of opening O1. In this way, the openings O2 and the openings O1 may regulate the light acceptance angle of the sensor layer SR to realize the light collimation design.

In some embodiments, the second light-shielding layer 122 may include a metal layer M2 and a metal oxide layer B2, and the metal layer M2 may be disposed between the metal oxide layer B2 and the first light-shielding layer 121. Similar to the first light-shielding layer 121, the metal oxide layer B2 of the second light-shielding layer 122 may be formed by oxidizing and blackening the metal layer M2. For example, when the metal layer M2 includes Mo, the metal oxide layer B2 may include MoTaOx; when the metal layer M2 includes Ti, the metal oxide layer B2 may include TiOx; when the metal layer M2 includes Nb, the metal oxide layer B2 may include NbOx; and when the metal layer M2 includes W, the metal oxide layer B2 may include WOx. In some embodiments, when a thickness of the metal oxide layer B2 is between about 450 Å and 850 Å, the metal oxide layer B2 may exhibit relatively low reflectivity, so that the reflected stray light entering the sensor layer SR may be reduced to a minimum, thus reducing the noise ratio entering the sensing layer SR and improving the sensing resolution of the sensing element 112

In some embodiments, the optical sensing device 10 may further include a third light-shielding layer 123. The third light-shielding layer 123 may be disposed on the second light-shielding layer 122, and a planar layer PL3 may be disposed between the third light-shielding layer 123 and the second light-shielding layer 122. The third light-shielding layer 123 may have multiple openings O3, the microlens structures MIL may be disposed in the openings O3, orthogonal projections of the openings O3 on the substrate SB may overlap the orthogonal projections of the openings O1 and the openings O2 on the substrate SB, and a diameter of the opening O3 may be larger than diameters of the opening O1 and the opening O2. Preferably, a central axis of the opening O3 may overlap the central axes of the opening O1, the opening O2, and the microlens structure ML. In this way, the microlens structures ML, the openings O1, and the openings O2 may regulate the light acceptance angle of the sensor layer SR to realize the light collimation design. In some embodiments, since the opening O3 of the third light-shielding layer 123 may have a larger diameter, a material of the third light-shielding layer 123 may include materials such as black resin or graphite.

In some embodiments, the third light-shielding layer 123 may include a metal layer M3 and a metal oxide layer B3, and the metal layer M3 may be disposed between the metal oxide layer B3 and the second light-shielding layer 122. Similar to the first light-shielding layer 121 and the second light-shielding layer 122, the metal oxide layer B3 of the third light-shielding layer 123 may be formed by oxidizing and blackening the metal layer M3. For example, when the metal layer M3 includes Mo, the metal oxide layer B3 may include MoTaOx; when the metal layer M3 includes Ti, the metal oxide layer B3 may include TiOx; when the metal layer M3 includes Nb, the metal oxide layer B3 may include NbOx; and when the metal layer M3 includes W, the metal oxide layer B3 may include WOx. In some embodiments, when a thickness of the metal oxide layer B3 is between about 450 Å and 850 Å, the metal oxide layer B3 may exhibit relatively low reflectivity, so that the reflected stray light entering the sensor layer SR may be reduced to a minimum, thus reducing the noise ratio entering the sensing layer SR and improving the sensing resolution of the sensing element 112.

In some embodiments, materials of the planar layer PL2 and the planar layer PL3 may include organic materials, such as acrylic, siloxane, polyimide, epoxy, or a stack of the above materials, but not limited thereto.

In this embodiment, the optical sensing device 10 may have a sensing area SA and a non-sensing area NA. The sensing element 112 may be disposed in the sensing area SA, and an orthogonal projection of the light absorbing layer LAa on the substrate SB may overlap an orthogonal projection of the sensing area SA on the substrate SB. That is, the light absorbing layer LAa, may be disposed in the sensing area SA. In this way, the stray light reflected by the sensing element 112 and the metal layer M1 after the beam LB1 passing through the microlens structure ML and the opening O2 and the opening O1 may be absorbed by the light absorbing layer LAa, and will not be reflected to the sensing element 112 to increase the sensing noise.

In some embodiments, the sensing area SA may be disposed in a central area of the optical sensing device 10, and the non-sensing area NA may be disposed in a peripheral area of the optical sensing device 10. For example, the non-sensing area NA may surround the sensing area SA, but is not limited thereto. In some embodiments, a material of the light absorbing layer LAa may include black resin, but not limited thereto.

Hereinafter, other embodiments of the disclosure are illustrated using FIG. 2 to FIG. 6, and the reference numerals and related contents of the embodiments of FIG. 1A to FIG. 1B are used, where the same numerals are used to denote the same or similar elements, and the description of the same technical contents is omitted. For a description of the omitted parts, reference is made to the embodiments in FIG. 1A to FIG. 1B, which are not repeated in the following descriptions.

Figure 2:
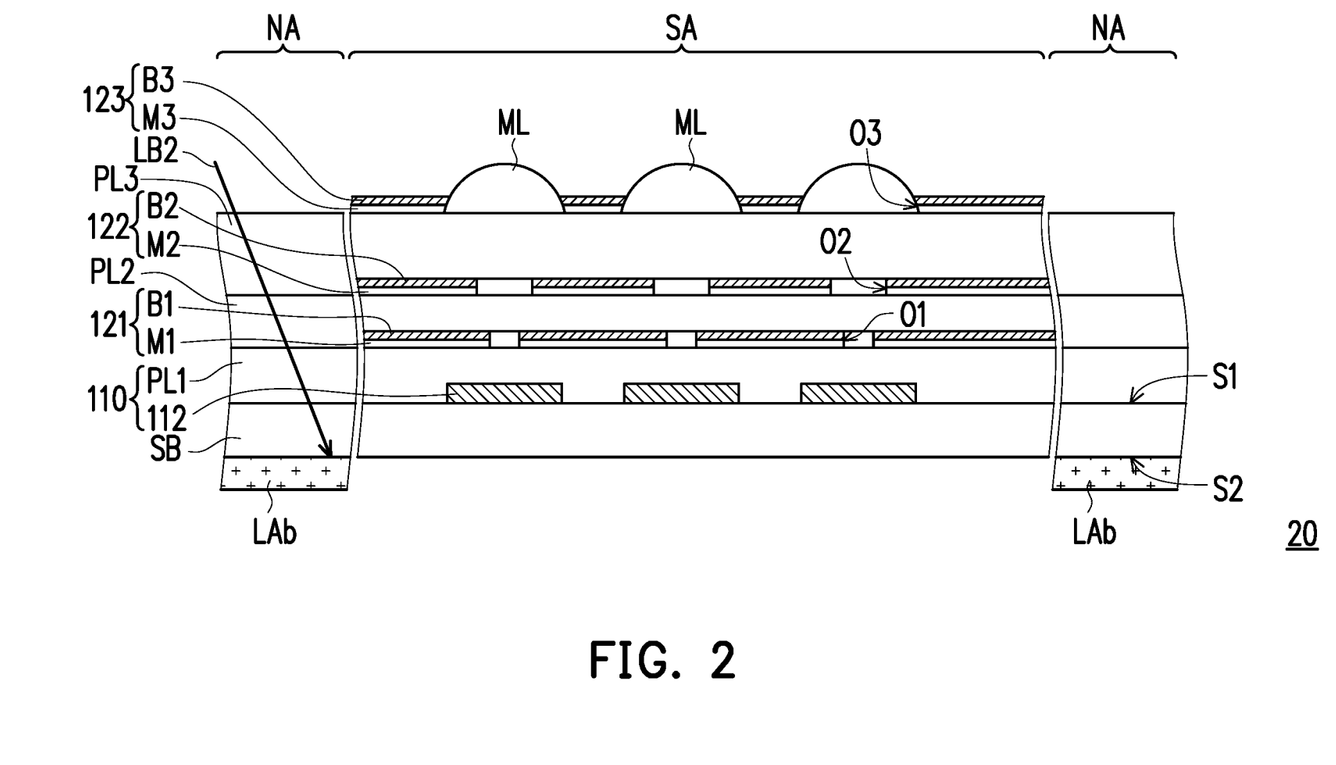
FIG. 2 is a schematic cross-sectional view of an optical sensing device 20 according to an embodiment of the disclosure.

FIG. 2 is a schematic cross-sectional view of an optical sensing device 20 according to an embodiment of the disclosure. The optical sensing device 20 includes: a substrate SB having a first surface S1 and a second surface S2 opposite to each other; a sensing element layer 110 disposed on the first surface S1 and including multiple sensing elements 112; a first Light-shielding layer 121 disposed on the sensing element layer 110 and having multiple openings O1, in which orthogonal projections of the openings O1 on the substrate SB overlapping orthogonal projections of the sensing elements 112 on the substrate; and a light absorbing layer LAb disposed on the second surface S2.

Compared with the optical sensing device 10 shown in FIG. 1A to FIG. 1B, the optical sensing device 20 shown in FIG. 2 is different in that: an orthogonal projection of the light absorbing layer LAb on the substrate SB overlaps an orthogonal projection of a non-sensing area NA on the substrate SB. In other words, the light absorbing layer LAb of the optical sensing device 20 may be disposed in the non-sensing area NA. In this way, a beam LB2 may be absorbed by the light absorbing layer LAb after passing through planar layers PL3, PL2, PL1 and the substrate SB, and will not be reflected to the sensing element 112 to increase the sensing noise, so that the optical sensing device 20 may have an improved sensing resolution.

In some embodiments, the optical sensing device 20 may further include the second light-shielding layer 122, the third light-shielding layer 123, the multiple microlens structures ML, and the planar layers PL2 and PL3, so that the openings O1 of the first light-shielding layer 121, the openings O2 of the second light-shielding layer 122, and the microlens structures ML may regulate the light acceptance angle of the sensing elements 112 to realize the light collimation design. Although FIG. 1A and FIG. 2 illustrate that the first light-shielding layer 121, the second light-shielding layer 122, and the third light-shielding layer 123 are only disposed in the sensing area SA, they are not limited thereto. In some embodiments, the first light-shielding layer 121, the second light-shielding layer 122, and the third light-shielding layer 123 may also be disposed in the non-sensing area NA.

Figure 3:
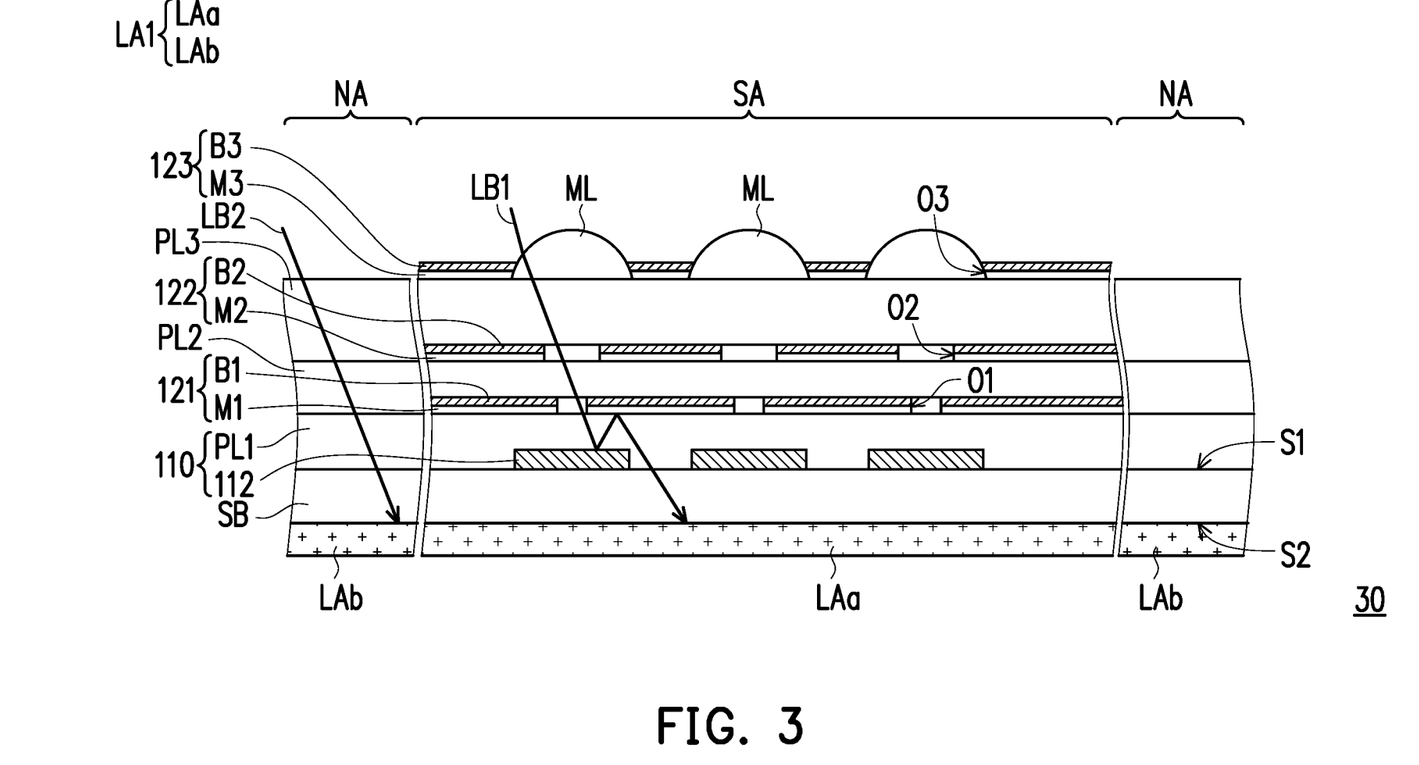
FIG. 3 is a schematic cross-sectional view of an optical sensing device 30 according to an embodiment of the disclosure.

FIG. 3 is a schematic cross-sectional view of an optical sensing device 30 according to an embodiment of the disclosure. The optical sensing device 30 includes: a substrate SB having a first surface S1 and a second surface S2 opposite to each other; a sensing element layer 110 disposed on the first surface S1 and including multiple sensing elements 112; a first Light-shielding layer 121 disposed on the sensing element layer 110 and having multiple openings O1, in which orthogonal projections of the openings O1 on the substrate SB overlapping orthogonal projections of the sensing elements 112 on the substrate; and a light absorbing layer LA1 disposed on the second surface S2.

Compared with the optical sensing device 10 shown in FIG. 1A to FIG. 1B, the optical sensing device 30 shown in FIG. 3 is different in that: the light absorbing layer LA1 may include a light absorbing layer LAa and a light absorbing layer LAb, and an orthogonal projection of the light absorbing layer LA1 on the substrate SB overlaps orthogonal projections of a sensing area SA and a non-sensing area NA on the substrate SB. In other words, the light absorbing layer LA1 of the optical sensing device 30 may be disposed in the sensing area SA and the non-sensing area NA, In this way, the stray light reflected by the sensing element 112 and a metal layer M1 after a beam LB1 passing through a microlens structure ML and an opening O2 and the opening O1 may be absorbed by the light absorbing layer LAa, while a beam LB2 passing through planar layers PL3, PL2, and PL1 and the substrate SB may be absorbed by the light absorbing layer LAb and will not be reflected to the sensing element 112 to increase the sensing noise, so that the optical sensing device 30 may have an improved sensing resolution.

In some embodiments, the optical sensing device 30 may further include the second light-shielding layer 122, the third light-shielding layer 123, the multiple microlens structures ML, and the planar layers and PL3, and the openings O1 of the first light-shielding layer 121, the openings O2 of the second light-shielding layer 122, and the microlens structures ML may regulate the light acceptance angle of the sensing elements 112 to realize the light collimation design.

Figure 4:
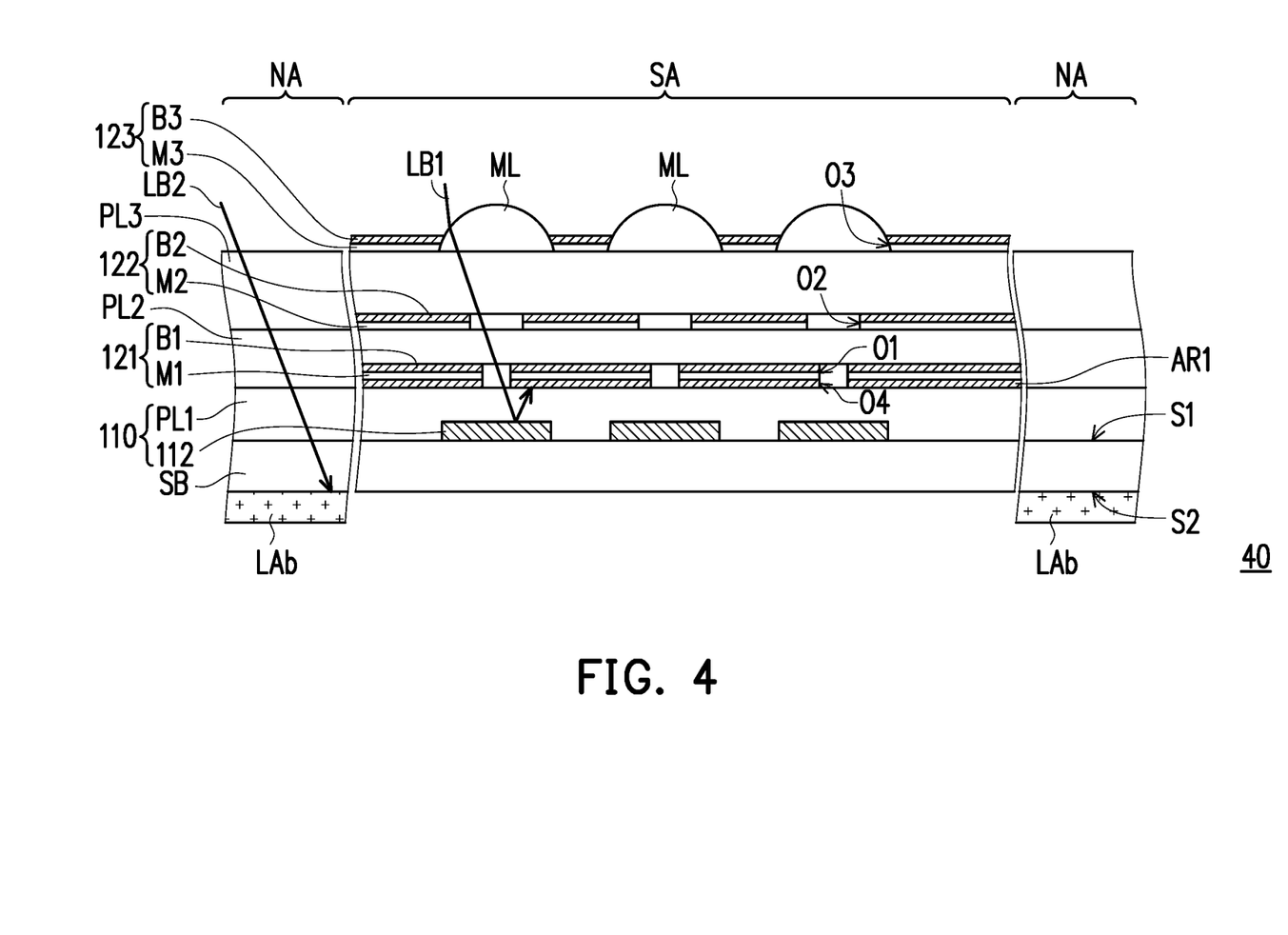
FIG. 4 is a schematic cross-sectional view of an optical sensing device 40 according to an embodiment of the disclosure.

FIG. 4 is a schematic cross-sectional view of an optical sensing device 40 according to an embodiment of the disclosure. The optical sensing device 40 includes: a substrate SB having a first surface S1 and a second surface S2 opposite to each other; a sensing element layer 110 disposed on the first surface S1 and including multiple sensing elements 112; a first light-shielding layer 121 disposed on the sensing element layer 110 and having multiple openings O1, in which orthogonal projections of the openings O1 on the substrate SB overlapping orthogonal projections of the sensing elements 112 on the substrate; and a light absorbing layer LAb disposed on the second surface S2.

Compared with the optical sensing device 20 shown in FIG. 2, the optical sensing device 40 shown in FIG. 4 is different in that: the optical sensing device 40 further includes an anti-reflection layer AR1 disposed between the first light-shielding layer 121 and the sensing element layer 110.

In this embodiment, the anti-reflection layer AR1 may have multiple openings O4, and the openings O4 may overlap the openings O1 of the first light-shielding layer 121. In other words, orthogonal projections of the openings O4 on the substrate SB may overlap orthogonal projections of the openings O1 and the sensing elements 112 on the substrate SB. In addition, a metal layer M1 of the first light-shielding layer 121 may be sandwiched between a metal oxide layer B1 and the anti-reflection layer AR1, and materials of the anti-reflection layer AR1 and the metal oxide layer B1 may be the same to prevent the reflected light of the metal layer M1 from entering the sensing element 112 to improve the sensing resolution of the sensing element 112. Although FIG. 4 illustrates that the anti-reflection layer AR1 is only disposed in the sensing area SA, it is not limited thereto. In some embodiments, the anti-reflection layer AR1 may also be disposed in the non-sensing area NA.

In some embodiments, the optical sensing device 40 may further include the second light-shielding layer 122, the third light-shielding layer 123, the multiple microlens structures ML, and the planar layers PL2 and PL3, and the openings O1 of the first light-shielding layer 121, the openings O4 of the anti-reflection layer AR1, the openings O2 of the second light-shielding layer 122, and the microlens structures ML may regulate the light acceptance angle of the sensing elements 112 to realize the light collimation design.

Figure 5:
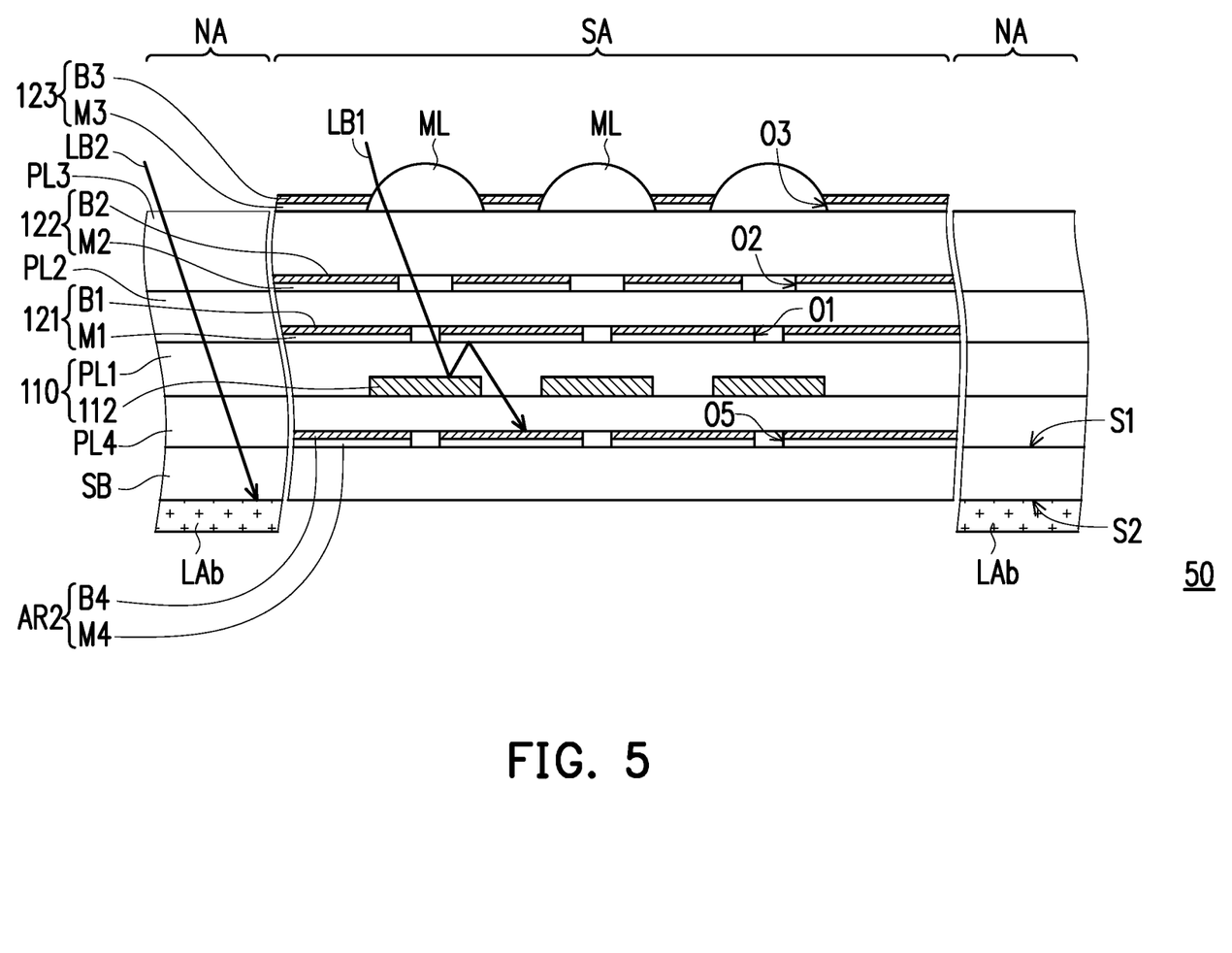
FIG. 5 is a schematic cross-sectional view of an optical sensing device 50 according to an embodiment of the disclosure.

FIG. 5 is a schematic cross-sectional view of an optical sensing device 50 according to an embodiment of the disclosure. The optical sensing device 50 includes: a substrate SB having a first surface S1 and a second surface S2 opposite to each other; a sensing element layer 110 disposed on the first surface S1 and including multiple sensing elements 112; a first light-shielding layer 121 disposed on the sensing element layer 110 and having multiple openings O1, in which orthogonal projections of the openings O1 on the substrate SB overlapping orthogonal projections of the sensing elements 112 on the substrate; and a light absorbing layer LAb disposed on the second surface S2.

Compared with the optical sensing device 20 shown in FIG. 2, the optical sensing device 50 shown in FIG. 5 is different in that: the optical sensing device 50 further includes an anti-reflection layer AR2 disposed between the sensing element layer 110 and the substrate SB.

In this embodiment, the anti-reflection layer AR2 may have multiple opening O5, and orthogonal projections of the openings O5 on the substrate SB may overlap orthogonal projections of the sensing elements 112 on the substrate SB. In some embodiments, the optical sensing device 50 may further include a planar layer PL4, and the planar layer PL4 may be disposed between the anti-reflection layer AR2 and the sensing element layer 110. However, in some embodiments, the anti-reflection layer AR2 may blanket the entire substrate SB without any opening.

In some embodiments, the anti-reflection layer AR2 may include a metal layer M4 and a metal oxide layer B4, and the metal oxide layer B4 may be disposed between the sensing element layer 110 and the metal layer M4. The anti-reflection layer AR2 may prevent a beam LB1 from being reflected by the sensing element 112 and the metal layer M1 and then passing below the substrate SB, thus reducing the sensing noise generated by the reflection of the components below the substrate SB.

The material of the anti-reflection layer AR2 and the first light-shielding layer 121 may be similar. For example, the metal oxide layer B4 of the anti-reflection layer AR2 may be formed by oxidizing and blackening the metal layer M4. For example, when the metal layer M4 includes Mo, the metal oxide layer B4 may include MoTaOx. In some embodiments, the metal layer M4 may include Ti, and the metal oxide layer B4 may include TiOx. In some embodiments, the metal layer M4 may include Nb, and the metal oxide layer B4 may include NbOx. In some embodiments, the metal layer M4 may include W, and the metal oxide layer B4 may include WOx. In some embodiments, a material of the planar layer PL4 may include organic materials, such as acrylic, siloxane, polyimide, epoxy, or a stack of the above materials, but not limited thereto.

In some embodiments, the optical sensing device 50 may further include the second light-shielding layer 122, the third light-shielding layer 123, the multiple microlens structures ML, and the planar layers PL2 and PL3, so that the openings O1 of the first light-shielding layer 121, the openings O2 of the second light-shielding layer 122, and the microlens structures ML may regulate the light acceptance angle of the sensing elements 112 to realize the light collimation design.

Figure 6:
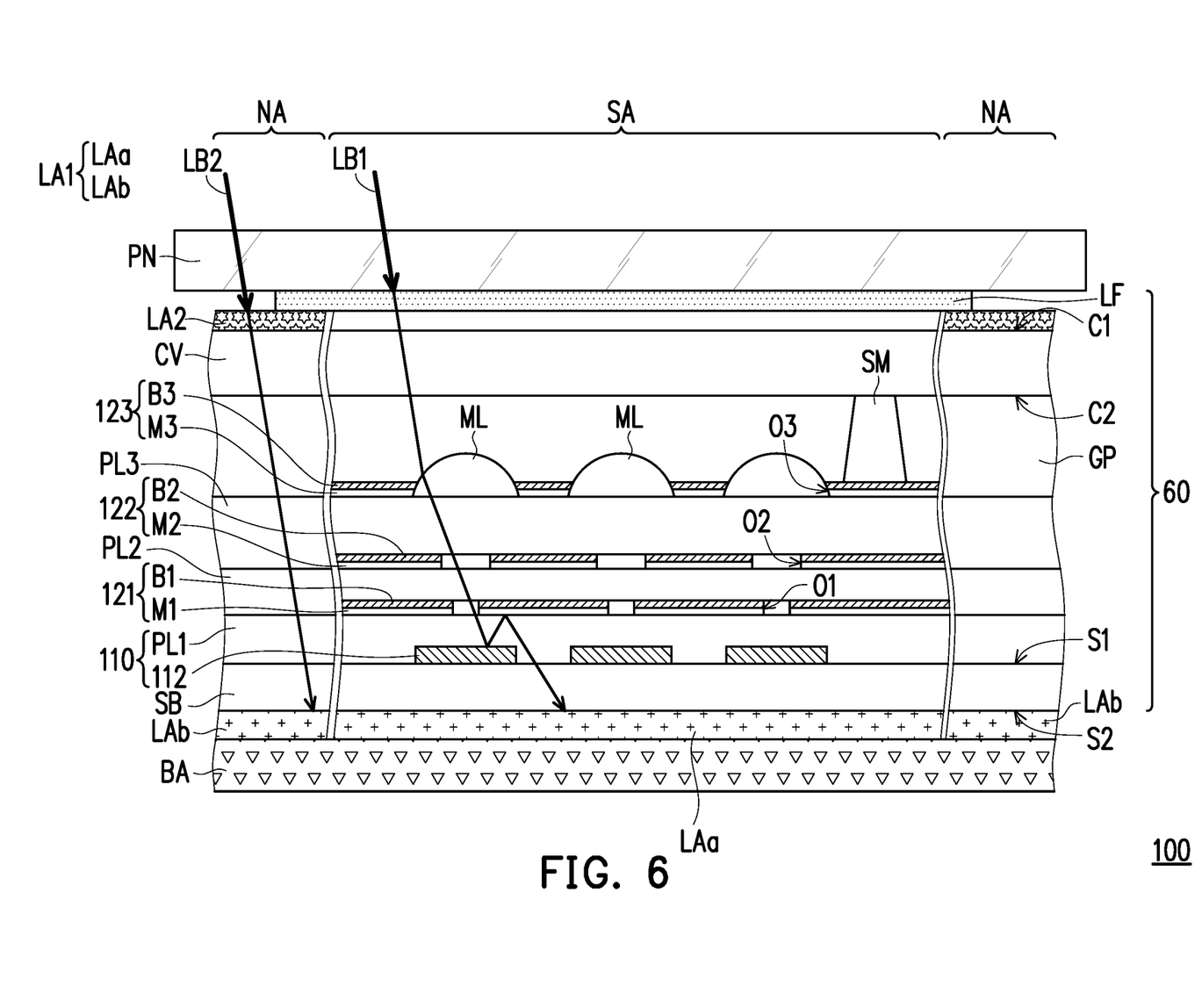
FIG. 6 is a schematic cross-sectional view of an electronic apparatus 100 according to an embodiment of the disclosure.

FIG. 6 is a schematic cross-sectional view of an electronic apparatus 100 according to an embodiment of the disclosure. The electronic apparatus 100 may include: an optical sensing device 60; a display panel PN disposed above the optical sensing device 60; and an element BA having a reflective surface disposed below the optical sensing device 60.

In this embodiment, the element BA having the reflective surface may be a battery, but not limited thereto. In some embodiments, the element BA having the reflective surface may be a conductive element, such as a connector with a metal film layer on the surface. In some embodiments, the element BA having the reflective surface may be a heat dissipation element with a surface provided with heat dissipation fins. In other embodiments, the element BA having the reflective surface may be a shielding element with a shielding film layer on the surface.

In this embodiment, the optical sensing device 60 may include: a substrate SB having a first surface S1 and a second surface S2 opposite to each other; a sensing element layer 110 disposed on the first surface S1 and including multiple sensing elements 112; a first light-shielding layer 121 disposed on the sensing element layer 110 and having multiple openings O1, in which orthogonal projections of the openings O1 on the substrate SB overlapping orthogonal projections of the sensing elements 112 on the substrate; and a light absorbing layer LA1 disposed between the second surface S2 of the substrate SB and the element BA having the reflective surface.

Compared with the optical sensing device 30 shown in FIG. 3, the optical sensing device 60 shown in FIG. 6 is different in that: the optical sensing device 60 further includes a cover plate CV opposite to the substrate SB, and the sensing element layer 110 and the first light-shielding layer 121 may be disposed between the cover plate CV and the substrate SB. The cover plate CV may be a transparent substrate, and its material may be a quartz substrate, a glass substrate, polymer substrate, or other suitable materials, but not limited thereto.

In some embodiments, the optical sensing device 60 may further include the second light-shielding layer 122, the third light-shielding layer 123, the multiple microlens structures ML, and the planar layers PL2 and PL3, so that the openings O1 of the first light-shielding layer 121, the openings O2 of the second light-shielding layer 122, the openings O3 of the third light-shielding layer 123, and the microlens structures ML may regulate the light acceptance angle of the sensing elements 112 to realize the light collimation design.

In some embodiments, the optical sensing device 60 may further include a spacer SM. The spacer SM may maintain a stable spacing GP between the cover plate CV and the third light-shielding layer 123, and at the same tune avoid the microlens structure ML crushing, and further improve the regulation of the optical focus point and the light acceptance angle to improve the sensing resolution of the optical sensing device 60.

In some embodiments, the optical sensing device 60 may further include a light absorbing layer LA2, and the light absorbing layer LA2 may be disposed on an opposite side of the cover plate CV opposite to the first light-shielding layer 121. Specifically, the cover plate CV may have a first surface C1 and a second surface C2 opposite to each other. The second surface C2 may face the first light-shielding layer 121, and the light absorbing layer LA2 may be disposed on the first surface C1 of the cover plate CV. In addition, an orthogonal projection of the light absorbing layer LA2 on the cover plate CV may overlap an orthogonal projection of a non-sensing area NA on the cover plate CV. In other words, the light absorbing layer LA2 may be disposed between the non-sensing area NA of the optical sensing device 60 and the display panel PN. In this way, a beam LB2 entering the non-sensing area NA may be partially absorbed, by the light absorbing layer LA2 when passing through the light absorbing layer LA2, and another part of the beam may be absorbed by a light absorbing layer LAb after passing through the cover plate CV, planar layers PL3, PL2, and PL1 and the substrate SB, so as not to be reflected by the element BA having the reflective surface and increase the sensing noise of the optical sensing device 60.

In some embodiments, the optical sensing device 60 may further include a filter layer LF. The filter layer LF may be disposed between the display panel PN and the optical sensing device 60, the light absorbing layer LA2 may be disposed between the filter layer LF and the cover plate CV, and an orthogonal projection of the filter layer LF on the cover plate CV overlaps at least an orthogonal projection of a sensing area SA on the cover plate CV. In some embodiments, the orthogonal projection of the filter layer LF on the cover plate CV may overlap orthogonal projections of the sensing area SA and part of a non-sensing area NA on the cover plate CV. In some embodiments, a material of the filter layer LF may include, for example, a color resist material, but is not limited thereto. In this way, a beam LB1 entering the sensing area SA may be partially absorbed by the filter layer LF (e.g., invisible light) when passing through the filter layer LF, and the stray light caused by the remaining light (e.g., visible light) passing through the microlens structure ML and the openings O2 and O1 and reflected by the sensing element 112 and the metal layer M1 may be absorbed by the absorbing layer LAa, so as to reduce the sensing noise of the optical sensing device 60.

To sum up, the optical sensing device of the disclosure may reduce the sensing noise caused by the reflected stray light of the beam passing through the optical sensing device by disposing the light absorbing layer on the second surface of the substrate, thereby improving the sensing resolution of the optical sensing device.

It will be apparent to those skilled in the art that various modifications and variations can be made to the disclosed without departing from the scope or spirit of the disclosure. In view of the foregoing, it is intended that the disclosure covers modifications and variations provided that they fall within the scope of the following claims and their equivalents.

What is claimed is:

1. An optical sensing device comprising:
    a substrate having a first surface and a second surface opposite to each other;
    a sensing element layer disposed on the first surface and comprising a plurality of sensing elements;
    a first light-shielding layer disposed on the sensing element layer and comprising a plurality of first openings, wherein orthogonal projections of the first openings on the substrate overlap orthogonal projections of the sensing elements on the substrate respectively;
    a first light absorbing layer disposed on the second surface; and
    an anti-reflection layer disposed between the first light-shielding layer and the sensing element layer,
    wherein the anti-reflection layer has a plurality of second openings, and orthogonal projections of the second openings on the substrate overlap the orthogonal projections of the sensing elements on the substrate respectively.

2. The optical sensing device according to claim 1, wherein the optical sensing device has a sensing area and a non-sensing area, the non-sensing area surrounds the sensing area, and the sensing elements are disposed in the sensing area.

3. The optical sensing device according to claim 2, wherein an orthogonal projection of the first light absorbing layer on the substrate overlaps an orthogonal projection of the sensing area on the substrate.

4. The optical sensing device according to claim 2, wherein an orthogonal projection of the first light absorbing layer on the substrate overlaps an orthogonal projection of the non-sensing area on the substrate.

5. The optical sensing device according to claim 2, wherein an orthogonal projection of the first light absorbing layer on the substrate overlaps orthogonal projections of the sensing area and the non-sensing area on the substrate.

6. The optical sensing device according to claim 2 further comprising a cover plate opposite to the substrate, and the sensing element layer and the first light-shielding layer disposed between the cover plate and the substrate.

7. An optical sensing device comprising:
 a substrate having a first surface and a second surface opposite to each other;
 a sensing element layer disposed on the first surface and comprising a plurality of sensing elements;
 a first light-shielding layer disposed on the sensing element layer and comprising a plurality of first openings, wherein orthogonal projections of the first openings on the substrate overlap orthogonal projections of the sensing elements on the substrate respectively;
 a first light absorbing layer disposed on the second surface, wherein the optical sensing device has a sensing area and a non-sensing area, the non-sensing area surrounds the sensing area, and the sensing elements are disposed in the sensing area;
 a cover plate opposite to the substrate, wherein the sensing element layer and the first light-shielding layer are disposed between the cover plate and the substrate; and
 a second light absorbing layer disposed on a side of the cover plate opposite to the first light-shielding layer, wherein an orthogonal projection of the second light absorbing layer on the cover plate overlaps an orthogonal projection of the non-sensing area on the cover plate.

8. The optical sensing device according to claim 6 further comprising a filter layer disposed on a side of the cover plate opposite to the first light-shielding layer, and an orthogonal projection of the filter layer on the cover plate overlapping an orthogonal projection of the sensing area on the cover plate.

9. The optical sensing device according to claim 1, wherein the first light-shielding layer comprises a first metal layer and a first metal oxide layer, the first metal layer is disposed between the first metal oxide layer and the sensing element layer, and a thickness of the first metal oxide layer is between 450 Å and 850 Å.

10. An optical sensing device comprising:
 a substrate having a first surface and a second surface opposite to each other;
 a sensing element layer disposed on the first surface and comprising a plurality of sensing elements;
 a first light-shielding layer disposed on the sensing element layer and comprising a plurality of first openings, wherein orthogonal projections of the first openings on the substrate overlap orthogonal projections of the sensing elements on the substrate respectively;
 a first light absorbing layer disposed on the second surface; and
 an anti-reflection layer disposed between the sensing element layer and the substrate,
 wherein the anti-reflection layer comprises a second metal layer and a second metal oxide layer, and the second metal oxide layer is disposed between the sensing element layer and the second metal layer.

11. The optical sensing device according to claim 1 further comprising:
 a display panel disposed on a first side of the optical sensing device; and
 an element having a reflective surface, disposed on a second side of the optical sensing device, and the second side being opposite to the first side.

12. The optical sensing device according to claim 11, wherein the element having the reflective surface is a conductive element, a heat dissipation element, a shielding element, or a battery.

13. The optical sensing device according to claim 11, wherein the optical sensing device further comprises a second light absorbing layer disposed between the display panel and a non-sensing area of the optical sensing device.

14. The optical sensing device according to claim 11, wherein the optical sensing device further comprises a filter layer disposed between the display panel and a sensing area of the optical sensing device.

* * * * *